United States Patent [19]
Pierson

[11] Patent Number: 6,078,557
[45] Date of Patent: *Jun. 20, 2000

[54] METHOD OF USING OPTICAL COMPACT DISC

[76] Inventor: Gerald A. Pierson, 9931 Rivercrest Ct., Orlando, Fla. 32825

[*] Notice: This patent is subject to a terminal disclaimer.

[21] Appl. No.: 09/292,285

[22] Filed: Apr. 15, 1999

Related U.S. Application Data

[63] Continuation of application No. 08/856,915, May 15, 1997, Pat. No. 5,982,736.

[51] Int. Cl.[7] .................................................. G11B 7/24
[52] U.S. Cl. ................................... 369/273; 369/77.1
[58] Field of Search .................................. 369/272, 273, 369/274, 280, 283, 286, 292, 77.1; 360/2

[56] References Cited

U.S. PATENT DOCUMENTS

| | | | |
|---|---|---|---|
| D. 419,152 | 1/2000 | Lowenstein | D14/121 |
| 2,293,301 | 8/1942 | Mitchell | 40/340 |
| 2,961,922 | 11/1960 | Schwartz et al. | 353/16 |
| 3,302,520 | 2/1967 | Dimitracopoulous et al. | 353/120 |
| 3,691,312 | 9/1972 | Petersen | 360/2 |
| 4,812,633 | 3/1989 | Vogelgesang et al. | 235/487 |
| 4,868,373 | 9/1989 | Opheij | 235/380 |
| 4,904,853 | 2/1990 | Yokokawa | 235/487 |
| 5,411,259 | 5/1995 | Pearson et al. | 273/93 C |
| 5,417,431 | 5/1995 | Gluck | 273/293 |
| 5,433,035 | 7/1995 | Bauer | 40/124.1 |
| 5,441,278 | 8/1995 | Nalder | 273/296 |
| 5,480,156 | 1/1996 | Doederlein et al. | 273/237 |
| 5,579,296 | 11/1996 | Smith et al. | 369/273 |
| 6,016,298 | 1/2000 | Fischer | 369/75.1 |

FOREIGN PATENT DOCUMENTS

| | | |
|---|---|---|
| 7-6489 | 1/1995 | Japan . |
| 2 331 959 | 6/1999 | United Kingdom . |

OTHER PUBLICATIONS

Tyler Gray, Shape of CD's to Come, May 28, 1997 Orlando Sentinel, Business Section, p. B–1 and B–4; Article refers to Shape CD Inc.

*Primary Examiner*—William R. Korzuch
*Attorney, Agent, or Firm*—Allen, Dyer, Doppelt, Milbrath & Gilchrist, P.A.

[57] ABSTRACT

A trading card optical compact disc and method of using and forming the compact disc are provided which are compatible with a disc reader having a centrally located spindle and a seating ring for supporting and rotating a compact disc positioned thereon. The trading card optical compact disc according to an embodiment of the invention preferably has at least a first plastic rectangular layer having a width of about 2.5 inches and a length of about 3.5 inches and having a pattern of digital data encoded thereon. A second metallic layer is formed on at least portions of the first plastic layer, and a third protective layer is formed on at least the second layer for protecting the metallic layer. An indicia bearing fourth layer is formed on the third layer and has a generally planar upper surface for displaying indicia therefrom. An opening extends through the first, second, third, and fourth layers in a medial portion thereof. A trading card interface seat is preferably integrally formed in at least the first layer for seating the trading card onto a loading tray of a disc reader so as to interface with only portions of the seating ring of the disc reader and to read digital data stored thereon from the trading card optical compact disc.

3 Claims, 3 Drawing Sheets

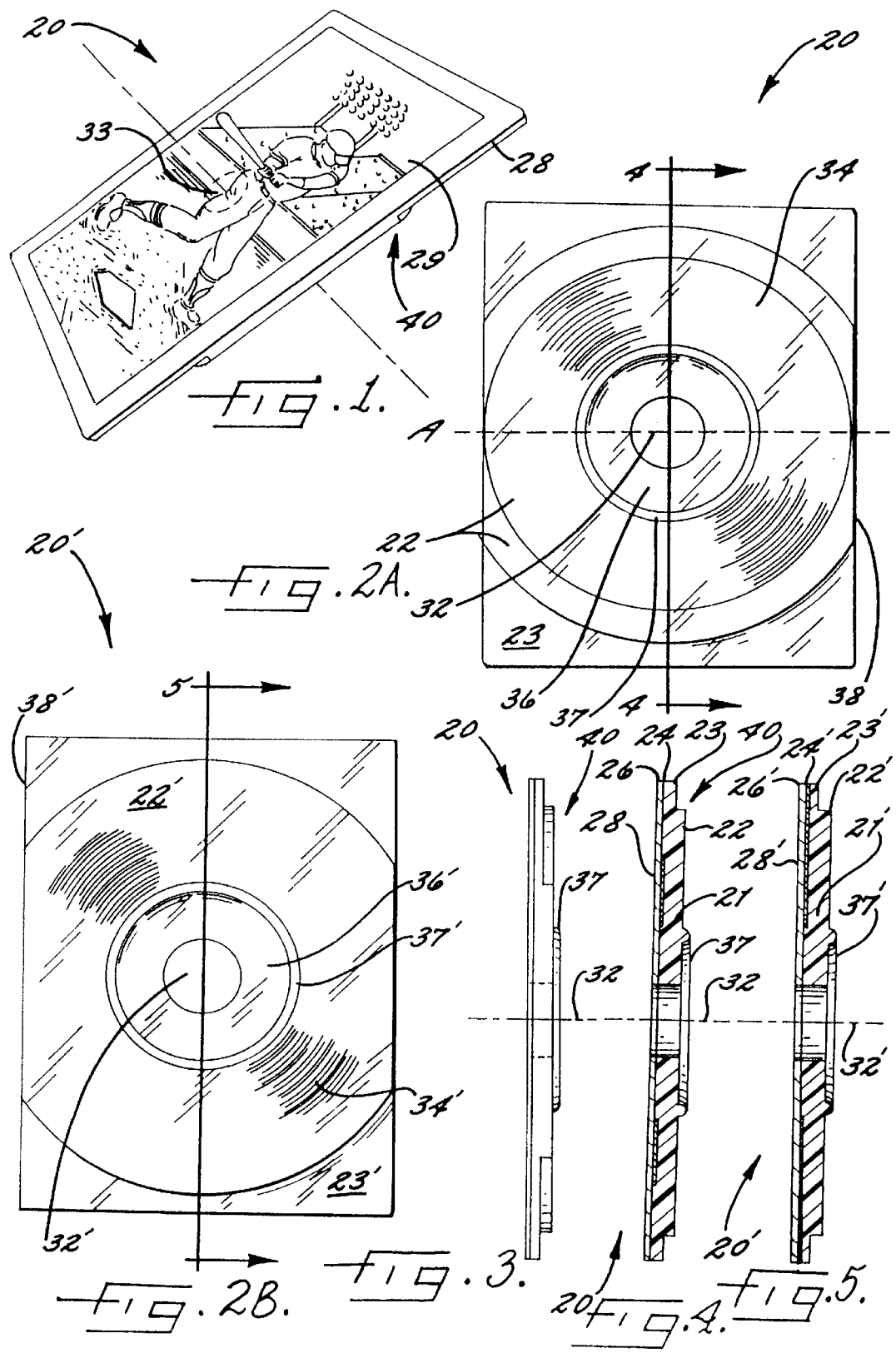

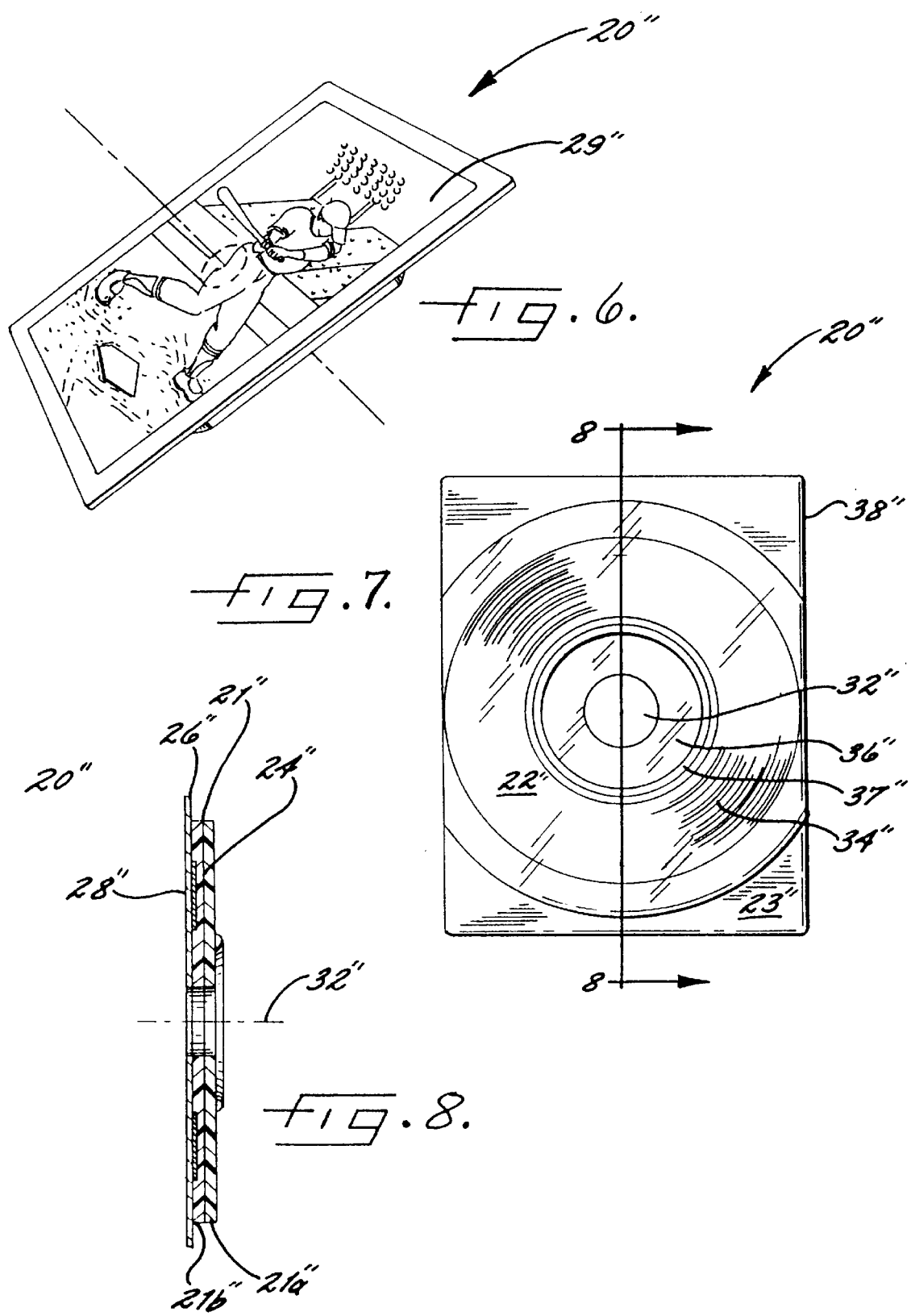

METHOD OF USING OPTICAL COMPACT DISC

This application is a continuation of Ser. No. 08/856,915 filed on May 15, 1997, now U.S. Pat. No. 5,982,736, the disclosures of which are hereby incorporated by reference in their entirety.

FIELD OF THE INVENTION

This invention relates to novelty trading items and, more particularly, to novelty trading items for storing and communicating data to enthusiasts, hobbyists, and collectors.

BACKGROUND OF THE INVENTION

Over the years the trading card industry has developed as both a novelty item and a collectors item. As time goes by, the value of many of these trading cards which have printed indicia thereon has increased so that the trading card industry has grown significantly over the years and many trading cards have substantially increased in value. As technology has changed, however, various types of trading cards and methods of storing and communicating data have been developed.

The concept of associating card devices which store and communicate information to a user with indicia or an image thereon has been known for many years. Examples of such devices can be seen in U.S. Pat. No. 3,691,312 by Petersen titled "Tape Recording Apparatus And System Having A Very Thin Cassette," U.S. Pat. No. 4,904,853 by Yokokawa titled Dual-Function Information-Carrying Sheet Device," U.S. Pat. No. 5,411,259 by Pearson et al. titled "Video Sports Game System Using Trading Cards," and U.S. Pat. No. 5,433,035 by Bauer titled "Talking Entertainment Card." These prior card devices, however, either used older methods of storing and communicating information such as cassettes or used integrated circuit technology. Accordingly, these prior methods can be expensive and complex to manufacture even in large volumes and neither understood nor appreciated the benefits, capabilities, design, or construction of optical digital data storage devices, and more particularly optical compact discs. Only recently has the technology and concepts related to the use of optical digital data storage devices really increased and been accepted in the market so that the relative price of optical digital data storage media has decreased dramatically.

Conventional compact discs, for example, are conventionally fabricated in either 80 millimeter ("mm") or 120 mm sizes and are formed of generally rigid plastic discs. As understood by those skilled in the art, the discs are often formed by the use of a mold-based replication system using injection molding techniques. Each compact disc includes a series of either circular or spiral data tracks which are illuminated and read by a source of coherent light such as a laser. In producing these compact discs, data is optically mastered from data files and positive copies of the data are made. Die stampers are produced from electroplated shims, and discs are molded from the negative images on the die stampers. The discs are then individually metalized, and a lacquer coating is applied to each disc. The layer of rigid plastic positioned between each data track and the source of coherent light provides structural rigidity, protects the data tracks, and also functions as a single integral lens element to refract and focus the coherent light beam onto a selected data track. A disc label is also printed, and the disc inserted into a clam shell or other package for shipment to customers.

Recently, however, other thin film digital data storage medium and methods of manufacturing digital data storage media have been developed including for use with trading cards. An example of this thin film digital data storage medium and related methods can be seen in U.S. Pat. No. 5,579,296 by Smith et al. titled "Optically Readable Thin Film Digital Data Storage Medium." These recently developed trading cards, however, require extensive and new manufacturing investments, require a special adaptor to make the trading cards compatible with compact disc playing systems, and can be inhibited by marketing and manufacturing constraints, including the additional special adaptor, which can make this recently developed technology less commercially feasible.

SUMMARY OF THE INVENTION

With the foregoing in mind, the present invention provides a trading card optical compact disc and methods of using a compact disc which are readily compatible with existing disc readers and relatively inexpensive to manufacture. The present invention also advantageously provides a trading card optical compact disc and method of forming a trading card that stores and communicates trading card information to a user of a disc reader in a manner that is relatively easy to manufacture in conjunction with known optical compact disc manufacturing techniques and thereby does not require extensive additional molding and tooling costs. The present invention further provides a trading card optical compact disc which does not require a separate special adapter for compatibility with existing disc readers.

More particularly, a trading card optical compact disc and method of using and forming the compact disc are provided which are compatible with a disc reader having a centrally located spindle and a seating ring for supporting and rotating a compact disc positioned thereon. The trading card optical compact disc according to a first embodiment of the present invention preferably has at least a first plastic rectangular layer having a width of about 2.5 inches and a length of about 3.5 inches and having a pattern of digital data encoded thereon. A second metallic layer if formed on at least portions of the first plastic layer, and a third protective layer is formed on at least the second layer for protecting the metallic layer. An indicia bearing fourth layer is formed on the third layer and has a generally planar upper surface for displaying indicia therefrom. An opening extends through the first, second, third, and fourth layers in a medial portion thereof. Trading card interface seating means is preferably integrally formed in at least the first layer for seating the trading card onto a loading tray of a disc reader so as to interface with only portions of the seating ring and not other portions of the seating ring of the disc reader and to read digital data stored thereon from the trading card optical compact disc.

According to the present invention, the trading card seating means is preferably provided by the at least a first plastic layer which has a major elevational portion having a first predetermined height and a minor elevational portion having a second predetermined height. The major elevational portion has the encoded digital data thereon, and the minor elevational portion is preferably devoid of the encoded digital data. For alignment, balancing, and compatibility purposes, the major elevational portion is advantageously formed in a medial portion of the trading card and has first and second pairs of spaced-apart outer side peripheries defining outer boundaries of the major elevational portion. Each of the first pair of space-apart outer side peripheries arcuately extend between each of the second pair of space-apart outer side peripheries. Each of the second pair of space-apart outer side peripheries extend generally linearly between each of the first pair of spaced-apart outer peripheries. Each of the arcuately-extending first pair of spaced-apart outer side peripheries of the major elevational portion are centered about an axis extending through the medial opening and generally perpendicular to the linearly-extending second pair of space-apart outer side peripheries. The encoded digital data of the major elevational portion of the first layer is formed within a circular data zone and preferably does not cover, i.e., less than, the entire surface area of the major elevational portion of the first layer. The circular data zone has a first inner circular periphery having a radius of at least 0.6 inches and a second outer circular periphery having a radius of less than 1.25 inches. The circular data zone is preferably capable of storing between 60–70 Megabytes of information or data therein in some compact disc formats, e.g., audio or CD-ROM, or 450–500 Megabytes in other compact disc formats, e.g., digital video. A first non-metallic zone surrounds and extends outwardly a predetermined distance from the medial opening, and a second non-metallic zone extends inwardly from the rectangular outer perimeter of the trading card optical compact disc a predetermined distance.

By the provision of the trading card interface seating means, the trading card optical compact disc of the present invention advantageously allows a user thereof to readily position the disc into a conventional disc reader with any separate special attachments, adapters, or fasteners. The positioning of and construction of the trading card interface seating means also enables the disc to balance and rotate effectively within a conventional disc reader. By not requiring a separate adapter, the trading card optical compact disc advantageously can be easier to use and, is some embodiments, easier and less expensive to manufacture.

A method of using a trading card optical compact disc to communicate digitally encoded data to a user of an optical disc reader is also provided according to the present invention. The method preferably includes positioning a trading card optical compact disc having an opening extending through a medial portion thereof onto a loading tray of a disc reader so that the compact disc interfacingly seats onto only portions of a seating ring and not other portions of the seating ring of the disc reader.

Additionally, methods of forming a trading card optical compact disc are provided according to the present invention. A method preferably includes molding at least a first plastic rectangular layer having a width of about 2.5 inches and a length of about 3.5 inches and having a pattern of digital data encoded thereon. The at least a first plastic layer preferably includes a major elevational portion having a first predetermined height and a minor elevational portion having a second predetermined height. The major elevational portion has the encoded digital data thereon and the minor elevational portion is devoid of the encoded digital data.

Another method of forming a trading card optical disc preferably includes positioning a compact disc having a pattern of digital data encoded thereon onto a medial portion of a surface of a trading card having a width of about 2.5 inches and a length of about 3.5 inches, the combination of the compact disc and the trading card having a major elevational portion and a minor elevational portion so that the major elevational portion interfacingly seats the combination onto a loading tray of a disc reader so as to interface with only portions of the seating ring and not other portions of the seating ring of the disc reader and to read digital data stored thereon from the trading card optical compact disc. The major elevational portion has the encoded digital data thereon, and the minor elevational portion is preferably devoid of the encoded digital data. The major elevational portion has first and second pairs of spaced-apart outer side peripheries defining outer boundaries of the major elevational portion. Each of the first pair of space-apart outer side peripheries arcuately extends between each of the second pair of space-apart outer side peripheries. Each of the second pair of space-apart outer side peripheries extends generally linearly between each of the first pair of spaced-apart outer peripheries.

Because the trading card optical compact disc and associated methods were conceived and developed while keeping in mind the commercial viability and ease of manufacturing, the trading card optical compact disc is preferably formed using conventional compact disc manufacturing techniques. This, for example, advantageously allows training, tooling, and other associated manufacturing costs to be reduced and advantageously provides incentives for manufacturers to more readily accept the technology for manufacturing purposes. In contrast to other known concepts, by providing incentives to make this technology readily manufacturable by existing compact disc manufacturers, the present invention achieves a significant goal in reducing the overall price of the end product to ultimate purchasers.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is a perspective view of trading card optical compact disc according to the present invention;

FIG. 2A is a bottom plan view of a trading card optical compact disc according to a first embodiment of the present invention;

FIG. 2B is a bottom plan view of a trading card optical compact disc according to a second embodiment of the present invention;

FIG. 3 is a side elevational view of a trading card optical compact disc according to a first embodiment of the present invention;

FIG. 4 is a vertical sectional view of a trading card optical compact disc according to taken long line 4—4 for FIG. 2A according to a first embodiment of the present invention;

FIG. 5 is a vertical sectional view of a trading card optical compact disc taken a long line 5—5 of FIG. 2B according to a second embodiment of the present invention;

FIG. 6 is a perspective view of a trading card optical compact disc according to the third embodiment of the present invention;

FIG. 7 is a bottom plan view of a trading card optical compact disc according to the third embodiment of the present invention;

FIG. 8 is a vertical sectional view of a trading card optical compact disc taken along the line 8—8 of FIG. 7 according to the third embodiment of the invention;

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 9:
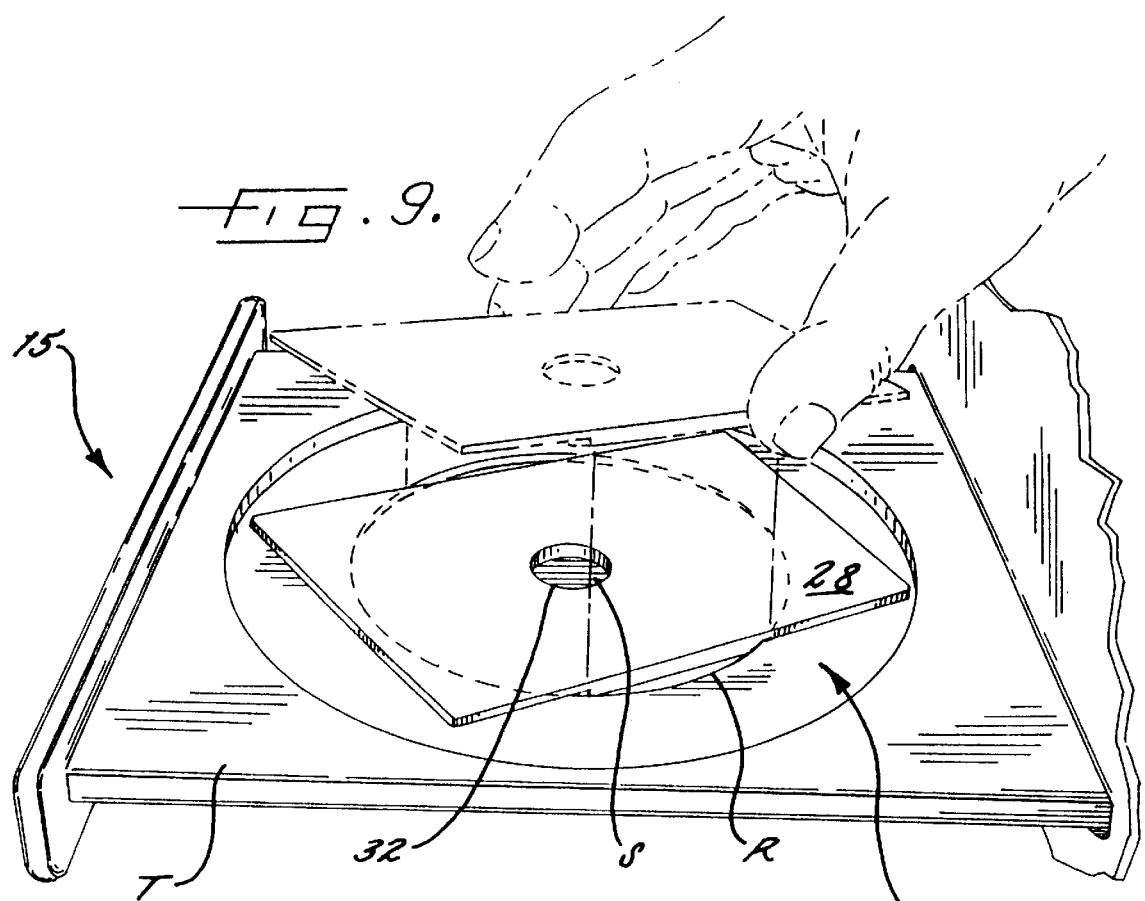
FIG. 9 is a perspective view of a trading card optical compact disc being positioned into a disc reader according to a first embodiment of the present invention.
Figure 10:
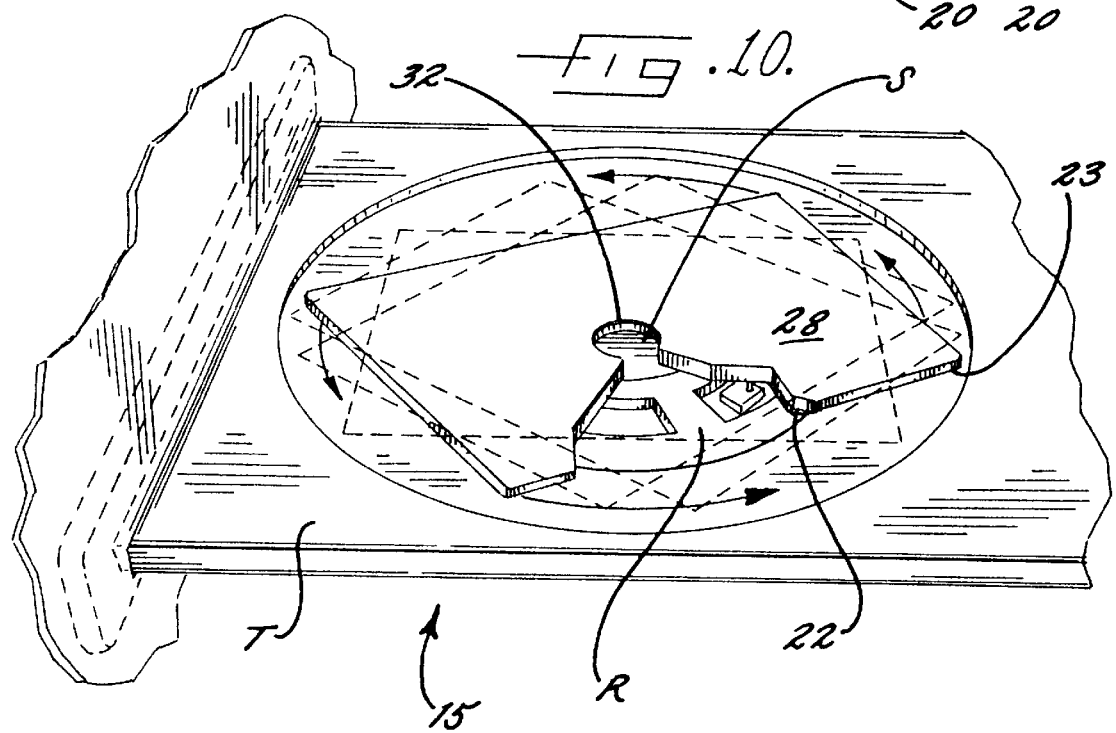
FIG. 10 is a fragmentary perspective view of a trading card optical disc positioned in a disc reader and being rotated for reading digital data therefrom.

FIG. 1 illustrates a perspective view of a trading card optical compact disc 20 according to an embodiment of the present invention. The trading card optical compact disc 20 is preferably compatible with a disc reader 15 (see FIGS. 9–10) which includes a centrally located spindle S and a seating ring R of a loading tray T for supporting and rotating a compact disc ("CD") positioned thereon. The trading card optical compact disc 20 has at least a first plastic rectangular layer 21 having a width of about 2.5 inches and a length of about 3.5 inches and having a pattern of digital data encoded thereon, i.e., pits and tracks as understood by those skilled in the art. The plastic of the first layer 21 is preferably a polycarbonate material or other optically transparent embossable plastic material as understood by those skilled in the art.

Various formats or data categories, including compact disc audio data, digital video disc ("DVD"), and/or compact disc read-only-memory ("ROM") data can be embossed into and stored on the first layer 21 by techniques known to those skilled in the art. For trading card applications (see FIG. 1), for example, digital data including visual information of photographs, video, textual information such as a person's or team's statistics and biographies, historical information, music, narration, and other data can be stored and recalled at will be a user of a disc reader 15. As understood by those skilled in the art, these trading card applications, for example, can include sports, music, entertainment, publishing, book, magazine, topical information, or various other types and formats of trading cards.

A conventional compact disc reader 15, for example, can include a loading tray T having a centrally located spindle S and a seating ring R for supporting and rotating a compact disc having planar upper and lower surfaces and embedded data tracks consisting of the encoded digital data. A compact disc reader 15 also has a digital data reading system which includes a source of light positioned for generating a light beam to illuminate the data tracks. A light beam is reflected from the data tracks and is modulated by the encoded digital data. A digital reading system of the compact disc reader 15 receives and converts a corresponding electrical signal for processing the read data, e.g., by a microprocessor-based decoding system.

Preferably, as illustrated in FIGS. 2A–2B, 3–5 and 8, a second metallic layer 24 is formed on at least portions of the first plastic layer 21, e.g., portions of or the entire major elevational portion 22 of the first plastic layer (see FIGS. 2A and 4). The metallic layer 24 preferably includes an aluminum material, such as conventionally used with forming optical compact discs, silver material, gold material, or other reflective metal material. The second layer 24 preferably provides a reflective surface for the light beam after it passes through the first optically transparent plastic layer 21 when attempting to read the digitally encoded data from the disc 20. As illustrated in FIGS. 2B and 5, for ease of manufacturing and aesthetic purposes, a second embodiment of the trading card 20' illustrates that the second layer 24' can also extend substantially the full length and width of the trading card optical compact disc 20'. The second embodiment also includes a first layer 21', a major elevational portion 22', the second layer 24', a third layer 26', a fourth indicia bearing layer 28', and a medial opening 32' extending therethrough (see also opening 32" of FIG. 8) as illustrated. In either the first or second embodiments of the trading card optical compact disc 20, 20', however, a non-metallic zone 23, 23' (see also 23" of FIG. 7) is preferably formed around the entire peripheries of the trading card optical compact disc 20, 20'.

Additionally, a third protective layer 26 is preferably formed on at least the second layer 24 for protecting the metallic layer 24 such as from chipping, flaking, or other damage. The third layer 26 is preferably a lacquer material or other thin hard coat material which is formed on the first and second layers 21, 24 to enhance the scratch resistance and provide other protection for these layers 21, 24. A fourth indicia bearing layer 28 is preferably formed on the third layer 26 and has a generally planar upper surface for displaying indicia 29 therefrom (see also indicia 29" of FIG. 6). The indicia 29 is preferably a photograph, sketch, textual information, or other images formed by ink or other material formed or positioned onto either the lacquer layer or formed by another material, e.g., paper or plastic, formed on or adhered to the lacquer layer 26. Also, for example, if the indicia bearing layer is a paper material adhered to the lacquer layer 26, then an adhesive is preferably positioned therebetween. The thickness of the combination of the first, second, third, and fourth layers 21, 24, 26, 28 of the first and second embodiments is preferably less than about 0.06 inches or 1.5 mm.

As best shown in FIGS. 6–8, the thickness of the combination of the first, second, third, and fourth layers 21", 24", 26", 28" of the third embodiment of a trading card optical compact disc 20", e.g., a DVD format, which preferably uses a digital video data format is also preferably less than about 0.06 inches or 1.5 mm. This embodiment, as understood by those skilled in the art, preferably has at least two plastic layers 21a", 21b" each which are less than 0.03 inches or 0.75 inches or which form a composite layer and defines a major elevational portion 22" as illustrated in the other embodiments. These two plastic layers 21a", 21b", however, are also preferably positioned prior to the metallic layer or second layer 24". These plastic layers 21a", 21b" are preferably used for data encoding, focusing, and image enhancement, especially in the DVD format as understood by those skilled in the art, have smaller pits, and form two levels of digitally encoded data.

An opening 32 preferably extends through the first, second, third, and fourth layers 21, 24, 26, 28 in a medial portion thereof (see FIGS. 1–2B and 6–7). The trading card optical compact disc 20 preferably has a perforated opening cover 33 which preferably attaches along perforation lines to either the third or fourth layers 26, 28. The opening cover 33 is preferably packaged and shipped with the trading card optical compact disc 20 so that the purchaser or user of the card can detach or remove the opening cover 33 from the card 20 for positioning the card 20 onto the spindle S of a disc reader 15. The opening 32 preferably has a diameter of about 0.6 inches, i.e., about 15 mm, and is primarily used to mount the card 20 onto the spindle S of a disc reader 15.

As illustrated in FIGS. 2A–2B, 3–5, and 7–8, a trading card optical compact disc 20 of the present invention also preferably has trading card interface seating means 40, e.g., preferably provided by a trading card interface seat, integrally formed in at least the first layer 21 for seating the trading card 20 onto a loading tray T of a disc reader 15 so as to interface with only portions of the seating ring R and not other portions of the seating ring R of the disc reader 15 and to read digital data stored thereon from the trading card optical compact disc 20. The trading card seating means 40 preferably includes at least the first plastic layer having a major elevational portion 22 having a first predetermined height and a minor elevational portion 23 having a second predetermined height. The first predetermined height preferably is about 0.05 inches. The major elevational portion 22 has the encoded digital data thereon, and the minor elevational portion 23 is preferably devoid of the encoded digital data. By the provision of the trading card interface seating means 40, the trading card optical compact disc 20 therefore advantageously does not require a separate special adapter for compatibility with existing disc readers. The positioning of and construction of the trading card interface seating means 40 also enables the disc 20 to balance and rotate effectively within a conventional disc reader 15.

The major elevational portion 22 is formed in a medial portion of the trading card 20 and has first and second pairs of spaced-apart outer side peripheries defining outer boundaries of the major elevational portion 22. Each of the first pair of space-apart outer side peripheries arcuately extend between each of the second pair of space-apart outer side peripheries. Each of the second pair of space-apart outer side peripheries extend generally linearly between each of the first pair of spaced-apart outer peripheries. Each of the arcuately-extending first pair of spaced-apart outer side peripheries of the major elevational portion 22 are centered about an axis A extending through the medial opening 32 and generally perpendicular to the linearly-extending second pair of space-apart outer side peripheries 38 (see also 38' of FIG. 2B and 38" of FIG. 7). A radius extending from a medial portion of the medial opening 32 to each of the arcuately-extending first pair of spaced-apart outer side peripheries of the major elevational portion 22 is less than 1.6 inches.

As perhaps best illustrated in FIG. 2A, the encoded digital data of the major elevational portion 22 of the first layer 21 is formed within a circular data zone 34 (see also 34' of FIGS. 2B and 5 and 34" of FIG. 7) and preferably does not cover, i.e., is less than, the entire surface area of the major elevational portion 22 of the first layer 21. The circular data zone 34 has a first inner circular periphery having a radius of at least 0.6 inches and a second outer circular periphery having a radius of less than 1.25 inches. The circular data zone 34 is preferably capable of storing between 60–70 Megabytes of digital information or digital data therein in some formats, e.g., audio or CD-ROM and capable of storing between 450–500 Megabytes of digital information in other formats, e.g., DVD. A first non-metallic zone 36 (see also 36' of FIGS. 2B and 5 and 36" of FIG. 7) surrounds and extends outwardly a predetermined distance from the medial opening 32. A second non-metallic zone 38 extends inwardly from the rectangular outer perimeter of the trading card optical compact disc 20 a predetermined distance. The first non-metallic zone 36 preferably includes a stacking ring 37 (see also 37' of FIGS. 2B and 5 and 37" of FIG. 7) surrounding the opening 32 for stacking another optical compact disc thereon such as used during mass production. It will be understood by those skilled in the art, however, that the stacking ring 37 is not necessary in the construction of the trading card optical compact disc 20 according to the present invention.

As illustrated in FIGS. 1–10, the present invention also advantageously provides methods of using and methods of forming a trading card optical compact disc 20 according to the present invention. As perhaps best illustrated in FIG. 9, a method of using a trading card optical compact disc 20 to communicate digitally encoded data to a user of a disc reader 15 preferably includes positioning a trading card optical compact disc 20 having an opening 32 extending through a medial portion thereof onto a spindle S of a disc reader 15. The compact disc 20 preferably interfacingly seats onto only portions of a seating ring R and not other portions of the seating ring R of the disc reader 15. The trading card optical compact disc 20 can also be rotated so as to read digitally encoded data therefrom (see, e.g., FIG. 10).

A method of forming a trading card optical compact disc 20 according to the present invention preferably includes molding at least one plastic rectangular layer 21 having a width of about 2.5 inches and a length of about 3.5 inches and having a pattern of digital data encoded thereon. Prior to this molding step, however, and as understood by those skilled in the art, data for the disc 20 is optically, e.g., preferably by laser techniques, mastered from data files or other software programs. The master is then electro-plated with a metal material, e.g., silver, and prepped for replicating positive mold copies or shims. Die stampers are produced from the electro-plated shims. The plastic layer 21 is then formed by injection molding from a negative image on a die stamper. Alternatively, as understood by those skilled in the art, two plastic layers 21a", 21b" can be formed as illustrated in FIG. 8 for DVD formats. The plastic layer 21 preferably includes a major elevational portion 22 having a first predetermined height and a minor elevational portion 23 having a second predetermined height. The major elevational portion 22 preferably has the encoded digital data thereon, and the minor elevational portion 23 is preferably devoid of the encoded digital data. These major and minor elevational portions 21, 24 and the digitally encoded data are preferably formatted and implemented in the optical mastering step.

The major elevational portion 22 is preferably formed in a medial portion of the trading card optical compact disc 20 and has first and second pairs of spaced-apart outer side peripheries defining outer boundaries of the major elevational portion 22. Each of the first pair of space-apart outer side peripheries arcuately extend between each of the second pair of space-apart outer side peripheries. Each of the second pair of space-apart outer side peripheries extending generally linearly between each of the first pair of spaced-apart outer peripheries. The encoded digital data of the major elevational portion 22 of the plastic layer 21 is preferably formed within a circular data zone 34 and comprises less than the entire surface area of the major elevational portion 22 of the plastic layer 21. The molding of the plastic layer 21 preferably includes molding an opening 34 extending through a medial portion of the plastic layer 21.

The method can also include applying a metallic layer 24 on at least portions of the plastic layer 21 and applying a third protective layer 26 on at least the metallic layer 24 for particularly protecting the metal material of the metallic layer 24. The metallic layer 24, for example, can be applied by metalizing the plastic layer 21 through a high speed spinning process or other metalizing processes known to those skilled in the art. The third layer 26 is preferably applied by pouring or spraying a curable liquid onto the second layer 24 in a controlled manner. The method can further include applying an indicia bearing layer 28 on the third layer 26. The indicia bearing layer 28 preferably has a generally planar upper surface for displaying indicia 29 therefrom. The formed disc 20 can then be packaged in a clam shell package, a custom package, or other compact disc package as understood by those skilled in the art. The present invention thereby advantageously provides a trading card optical compact disc 20 and method of forming a trading card that stores and communicates trading card information to a user of a disc reader 15 in a manner that is relatively easy to manufacture in conjunction with known optical compact disc manufacturing techniques, e.g., an in-line production process, and thereby does not require extensive additional molding and tooling costs.

A method of forming a trading card optical compact disc 20 according to another embodiment of the present invention includes positioning a compact disc having a pattern of digital data encoded thereon onto a medial portion of a surface of a trading card having a width of about 2.5 inches and a length of about 3.5 inches. The combination of the compact disc and the trading card preferably have a major elevational portion and a minor elevational portion so that the major elevational portion interfacingly seats the combination onto a loading tray T of a disc reader 15 so as to interface with only portions of the seating ring R and not other portions of the seating ring R of the disc reader 15 and to read digital data stored thereon from the trading card optical compact disc 20. The major elevational portion 22 has the encoded digital data thereon and the minor elevational portion 23 is preferably devoid of the encoded digital data. The major elevational portion 22 has first and second pairs of spaced-apart outer side peripheries defining outer boundaries of the major elevational portion 22. Each of the first pair of space-apart outer side peripheries arcuately extends between each of the second pair of space-apart outer side peripheries. Each of the second pair of space-apart outer side peripheries extends generally linearly between each of the first pair of spaced-apart outer peripheries. The major elevational portion 22 is formed in a medial portion of the trading card 20 and has first and second pairs of spaced-apart outer side peripheries defining outer boundaries of the major elevational portion 20. Each of the first pair of space-apart outer side peripheries arcuately extending from each of the second pair of space-apart outer side peripheries. Also, each of the second pair of space-apart outer side peripheries extending generally linearly from each of the first pair of spaced-apart outer peripheries. The combination preferably includes an opening 32 formed in a medial portion thereof. Each of the arcuately-extending first pair of spaced-apart outer side peripheries of the major elevational portion are centered about an axis extending through the medial opening 32 and generally perpendicular to the linearly-extending second pair of space-apart outer side peripheries. A radius extending from a medial portion of the medial opening to each of the arcuately-extending first pair of spaced-apart outer side peripheries of the major elevational portion is less than 1.6 inches.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method of using a trading card optical compact disc to communicate digitally encoded data to a user of an optical disc reader, the method comprising the step of positioning the trading card optical compact disc having an opening extending through a medial portion thereof onto a loading tray of the disc reader so that the trading card optical compact disc when positioned in an inner annular-shaped recess of the loading tray interfacingly abuts only portions of a periphery of the inner annular-shaped recess and not the entire periphery of the inner annular-shaped recess, the loading tray having the inner annular-shaped recess positioned in an outer annular-shaped recess so that the inner annular-shaped recess defines an inner optical compact disc seating ring positioned adjacent to the disc reader.

2. A method as defined in claim 1, further comprising the step of rotating the trading card optical compact disc so as to read digitally encoded data therefrom.

3. A method of using a trading card optical compact disc to communicate digitally encoded data to a user of an optical disc reader, the method comprising the step of positioning the trading card optical compact disc having an opening extending through a medial portion thereof onto a loading tray of a disc reader so that arcuate portions of the trading card optical compact disc when positioned within an annular-shaped recess of the loading tray which defines an optical compact disc seating ring interfacingly abut onto only portions of a periphery of the seating ring and non-arcuate portions of the trading card optical compact disc when also positioned within the annular-shaped recess do not interfacingly abut with, and are secant to, the periphery of the seating ring.

* * * * *

UNITED STATES PATENT AND TRADEMARK OFFICE
CERTIFICATE OF CORRECTION

PATENT NO. : 6,078,557
DATED : June 20, 2000
INVENTOR(S) : GERALD A. PIERSON

It is certified that error appears in the above-indentified patent and that said Letters Patent is hereby corrected as shown below:

On the cover page [76] Inventor: Please delete "9931 Rivercrest Ct., Orlando, Fla. 32825" and insert -- 7361 Bordwine Drive, Orlando, FL 32818 -- therefor.

Signed and Sealed this

Third Day of April, 2001

Attest:

NICHOLAS P. GODICI

Attesting Officer     Acting Director of the United States Patent and Trademark Office